US009512962B2

(12) United States Patent
Alekseyev et al.

(10) Patent No.: US 9,512,962 B2
(45) Date of Patent: Dec. 6, 2016

(54) GREASE GUN WITH SENSING CAPABILITY

(71) Applicants: Viktor Alekseyev, St. Louis, MO (US); Jose Americo Francisco dos Santos, Fort Mill, SC (US); Terry C. Peters, Concord, NC (US); Jerry Shew, Charlotte, NC (US); Kong Ling Guo, Suzhou (CN)

(72) Inventors: Viktor Alekseyev, St. Louis, MO (US); Jose Americo Francisco dos Santos, Fort Mill, SC (US); Terry C. Peters, Concord, NC (US); Jerry Shew, Charlotte, NC (US); Kong Ling Guo, Suzhou (CN)

(73) Assignee: LINCOLN INDUSTRIAL CORPORATION, St. Louis, MO (US)

( * ) Notice: Subject to any disclaimer, the term of this patent is extended or adjusted under 35 U.S.C. 154(b) by 174 days.

(21) Appl. No.: 14/069,068

(22) Filed: Oct. 31, 2013

(65) Prior Publication Data

US 2015/0114991 A1    Apr. 30, 2015

(51) Int. Cl.
  *F16N 27/00*  (2006.01)
  *F16N 3/12*   (2006.01)
  *F16N 11/08*  (2006.01)
  *F16N 29/02*  (2006.01)

(52) U.S. Cl.
  CPC ............... *F16N 11/08* (2013.01); *F16N 29/02* (2013.01); *F16N 2250/16* (2013.01); *F16N 2250/32* (2013.01); *F16N 2270/20* (2013.01)

(58) Field of Classification Search
  CPC ............ F16N 27/00; F16N 3/12; F16N 29/00; F16N 29/02; F16N 2250/32; F16N 2270/00; F16N 2270/72; F16N 11/08
  See application file for complete search history.

(56) References Cited

U.S. PATENT DOCUMENTS

| 4,096,422 | A   |   | 6/1978  | Fleming et al. |
| 4,967,882 | A   | * | 11/1990 | Meuer ................ B60R 17/02 184/6.4 |
| 5,878,842 | A   | * | 3/1999  | Rake .................. F16N 29/02 184/108 |
| 5,978,547 | A   |   | 11/1999 | Reynolds et al. |
| 6,832,620 | B2  | * | 12/2004 | Jaeger ................ F16N 13/02 137/237 |
| 8,528,782 | B2  |   | 9/2013  | Mergener et al. |

(Continued)

*Primary Examiner* — Nicholas J Weiss
(74) *Attorney, Agent, or Firm* — Mark Ussai; SKF USA Inc. Patent Dept.

(57) ABSTRACT

Systems, methods, and apparatus for dispensing a lubricant are provided, in which, for example, the apparatus includes a chamber having an inlet through which the lubricant is received and an outlet through which the lubricant is ejected. The apparatus also includes a piston movably positioned in the chamber to take lubricant into the chamber and eject it therefrom. The apparatus further includes a sensor configured to take a measurement of a condition related to a force applied to the piston to move the piston in the chamber. The apparatus additionally includes a controller coupled with the sensor so as to receive data related to the measurement from the sensor. The controller is configured to determine, using the measurement, an amount of lubricant ejected by the piston.

12 Claims, 5 Drawing Sheets

(56) References Cited

U.S. PATENT DOCUMENTS

| | | | |
|---|---|---|---|
| 8,915,331 B2* | 12/2014 | Alekseyev | H02P 7/08 184/105.2 |
| 2011/0253481 A1* | 10/2011 | Lin | F16N 11/08 184/108 |
| 2012/0247876 A1* | 10/2012 | Kreutzkamper | F16N 7/385 184/26 |
| 2013/0081903 A1 | 4/2013 | Alekseyev et al. | |
| 2013/0119081 A1 | 5/2013 | Mergener et al. | |

* cited by examiner

GREASE GUN WITH SENSING CAPABILITY

BACKGROUND

Grease guns are used to deliver lubrication in a variety of mechanical settings, including for lubricating bearings. Industrial grease guns generally include a piston that draws in grease from a cartridge into a priming chamber during an upstroke, and expels the grease from the chamber during a downstroke. Grease guns can be powered in a variety of ways, for example, by hand, pneumatics, or by an electric driver.

Electrically-driven grease guns generally rely on a battery to provide the power source. However, sensing capabilities in such grease guns are typically limited. For example, some grease guns may count the number of piston strokes and, with a known grease dose per piston stroke, determine the amount of grease that is expelled over a period of time.

Such determinations may be successfully implemented in a variety of applications. However, in others, they may be inaccurate and/or insufficient. For example, even with such stroke-counting capabilities, the grease-use calculations assume that only grease was fed into the priming chamber. In some cases, however, air pockets may develop, which are fed to the grease gun. Accordingly, the downstroke of the piston may result in expulsion of the air, instead of grease, resulting in the grease-use calculation being incorrect.

Furthermore, grease gun cartridges run out of grease, resulting in a cessation of grease delivery through the grease gun. However, the grease gun piston may continue being driven when the cartridge is empty, which can result in cavitation.

SUMMARY

Embodiments of the disclosure may provide an apparatus for dispensing a lubricant. The apparatus includes a chamber having an inlet through which the lubricant is received and an outlet through which the lubricant is ejected. The apparatus also includes a piston movably positioned in the chamber to take lubricant into the chamber and eject it therefrom. The apparatus further includes a sensor configured to take a measurement of a condition related to a force applied to the piston to move the piston in the chamber. The application additionally includes a controller coupled with the sensor so as to receive data related to the measurement from the sensor, wherein the controller is configured to determine, using the measurement, an amount of lubricant ejected by the piston.

Embodiments of the disclosure may also provide a method for dispensing a lubricant. The method may include driving a piston in a chamber, measuring a condition related to an amount of force applied to the piston to drive the piston, and determining that the lubricant was ejected from the chamber during a downstroke of the piston based on the condition that was measured.

Embodiments of the disclosure may also provide a system for dispensing a lubricant. The system includes a chamber having an inlet through which the lubricant is received and an outlet through which the lubricant is ejected. The system further includes a piston movably positioned in the chamber, and a motor driving the piston. The system may also include a sensor configured to measure a current drawn by the motor during operation, and a controller coupled with the sensor so as to receive data related to the current drawn from the sensor. The controller is configured to determine an amount of lubricant dispensed based on a difference between a maximum amount of the current drawn by the motor during a downstroke of the piston and a minimum amount of the current drawn during an upstroke of the piston.

BRIEF DESCRIPTION OF THE DRAWINGS

The accompanying drawings, which are incorporated in and constitute a part of this specification, illustrate an embodiment of the present teachings and together with the description, serve to explain the principles of the present teachings. In the figures.

Figure 1:
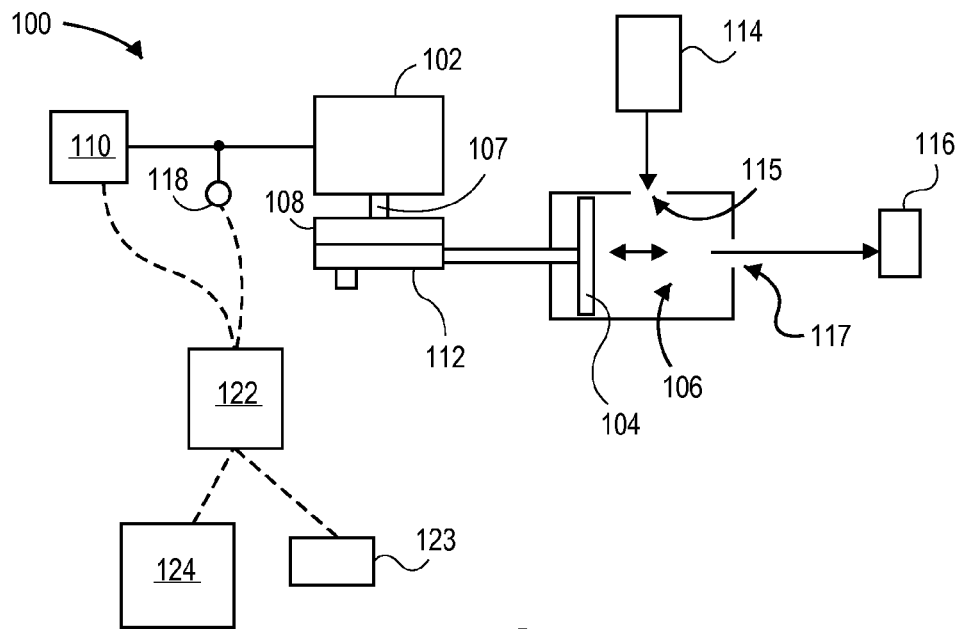
FIG. 1 illustrates a schematic view of a system for dispensing a lubricant such as grease, according to an embodiment.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawing that forms a part thereof, and in which is shown by way of illustration a specific embodiment in which the present teachings may be practiced. The following description is, therefore, merely exemplary.

FIG. 1 illustrates a schematic view of a system 100 for dispensing a lubricant, or any other fluid, oil, semi-solid lubricant, etc., according to an embodiment. In one specific embodiment, the system 100 may be configured to dispense grease, i.e., as a grease gun. For purposes of illustration, the system 10 may be described in terms of a grease gun; however, it will be appreciated that the system 100 may be configured for delivery of other lubricants, fluids, etc., for lubrication or other purposes.

As shown, the system 100 may include a motor 102 that drives a piston 104 in a priming chamber 106. For example, the motor 102 may rotate a linkage 108, e.g., via a shaft 107 and/or one or more gears. The motor 102 may be any suitable type of motor, for example, an AC or DC electric motor of any suitable size. Further, the motor 102 may be powered by a power supply 110, which may be a battery (e.g., 18V), generator, power grid, or any other source of electricity. In other embodiments, other types of drivers may be employed as the motor 102.

The linkage 108 may include or be coupled with a yoke 112 that is configured to translate the rotary motion of the shaft 107 into reciprocating motion in the piston 104. The yoke 112 may be any suitable structure, such as a cam, crank, rack and pinion, etc. Further, the yoke 112 may be configured to apply bi-directional force on the piston 104, such that the piston 104 is moved up and down in the priming chamber 106. It will be appreciated that "up" and "down" as the terms are used herein to describe the piston 104 or movement thereof, refer to the position of the piston 104 in the priming chamber 106. As the piston 104 moves "up" (i.e., "upstroke"), a volume in the chamber 106 that is available for the grease is increased, and when the piston 104 moves down ("downstroke"), the volume decreases.

The system 100 may also include a lubricant reservoir 114, which may be a removable grease cartridge, a refillable reservoir, or the like. The lubricant reservoir 114 may be coupled with an inlet 115, so as to receive grease in the priming chamber 106 from the lubricant reservoir 114. The system 100 may further include an outlet 117, which may be coupled with a fitting 116, for example, a grease fitting, via one or more nozzles, conduits, etc. The inlet 115 and outlet 117 may each include any valves, e.g., check valve, poppet valves, etc., configured to allow the grease to flow in the correct direction, as indicated, and prevent the flow from reversing.

The system 100 may further include a sensor 118 configured to take a measurement of a condition related to an amount of force applied to the piston 104. For example, the sensor 118 may be configured to measure an electrical current drawn by the motor 102 to rotate the shaft 107. In an embodiment, a larger current measurement may be associated with a greater force applied to move the piston 104, and thus a greater resistance to moving the piston 104 in the chamber 106. The sensor 118 may be electrically coupled with the power supply 110, the motor 102, or anywhere in a power circuit containing the two. Instead of or in addition to the sensor 118, the system 100 may include other sensors configured to measure conditions related to the amount of force applied to the piston 104. For example, a torque sensor may be coupled with the shaft 107 or the linkage 108. The torque sensor may measure an amount of force being applied to the shaft 107 or the linkage 108 to move the piston 104, and may thus perform a similar function to the sensor 118. In other embodiments, any other suitable type of sensor may be employed.

The system 100 may further include a controller 122, which may be coupled with the motor 102, the sensor 118, and/or the power supply 110. The controller 122 may be or include a printed circuit board including one or more microprocessors, programmable logic units, or the like. The controller 122 may also be coupled with a display 124, which may provide graphical indications of system 100 status, performance, error, etc., as will be described in greater detail below. The controller 122 may be coupled with one or more inputs, e.g., switches or buttons, whether physical or integrated into the display 124 (e.g., as a touch screen).

In operation of the system 100, the motor 102 drives the piston 104 up and down in the priming chamber 106. If the reservoir 114 is not empty, and the fitting 116 is not blocked, then the motor 102 driving the piston 104 on the upstroke may reduce a pressure in the priming chamber 106, thereby urging grease, or otherwise allowing grease to move, from the reservoir 114 and into the priming chamber 106. On the downstroke, the piston 104 may drive the grease through the outlet 117 and, e.g., through the fitting 116.

The controller 122 may control a speed of the motor 102, for example, in response to receiving setpoint inputs entered by a user via the input 123 (and/or the display 124). The setpoints may be related to a rate at which grease is pumped from the reservoir 114 to the outlet 117. The controller 122 may convert these setpoints to speeds in the motor 102 and control the speed of the motor 102 accordingly. Such speed changing may be accomplished in a variety of known ways, including mechanically, e.g., using gears or other transmission speed changing devices, or electrically, e.g., using potentiometers, activating/de-activating windings of the motor 102, varying the voltage applied to the motor 102, etc.

Further, the controller 122 may receive a "meter reset" via the input 123, when the reservoir 114 is replaced or refilled, such that the controller 122 is informed of the amount of grease that is in the reservoir 114 (e.g., by volume, mass, weight, etc.). The amount of grease that the reservoir 114 contains may be preset, e.g., as according to provision of a new cartridge. Thus, the meter reset may proceed by pressing a reset button of the input 123, thereby re-establishing the amount of grease to the maximum. In another embodiment, the input 123 for the meter reset may be variable, such that the meter reset may proceed by entering a weight, volume, or other indicia of amount of grease in the reservoir 114. The controller 122 may also be programmed with data indicative of a dose amount (volume, mass, weight, etc.) of the grease. The dose amount may be equal to the amount of grease pumped by each cycle of the piston 104. For example, the dose amount may be equal to the maximum volume in the priming chamber 106 (i.e., with the piston 104 at the end of an upstroke), minus the minimum volume in the priming chamber 106 (i.e., with the piston 104 at the end of a downstroke).

Figure 2A:
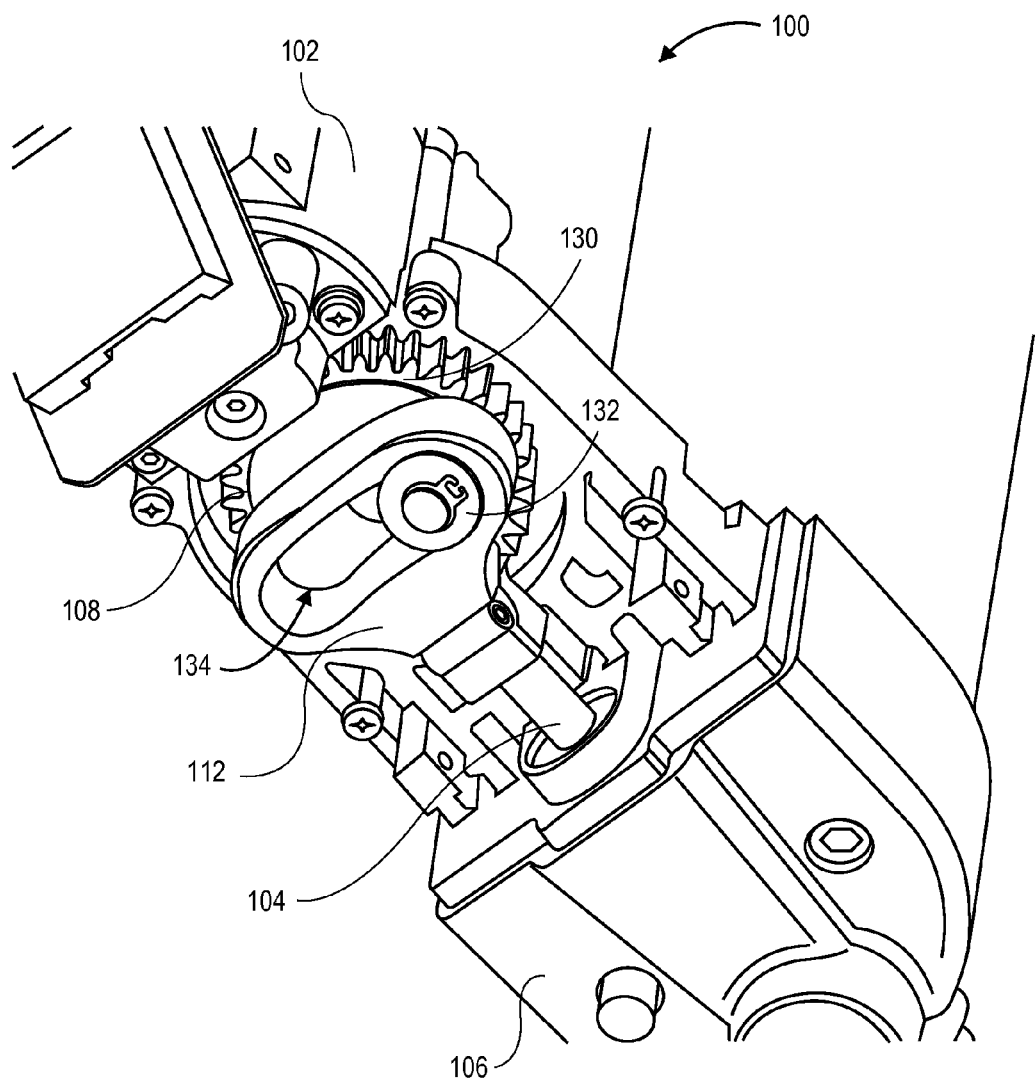
FIG. 2A illustrates a perspective view of a portion of the system, according to an embodiment.

FIG. 2A illustrates a perspective view of a portion of the system 100, according to an embodiment. As shown, the system 100 includes the linkage 108 and the yoke 112. The linkage 108 may include a gear 130 attached to a crank 132. The crank 132 may be received in a slot 134 formed in the yoke 112, such that rotation of the crank 132, as driven by the motor 102 via the gear 130 (and/or any other part of the linkage 108 or shaft 107 (FIG. 1)) pushes the piston 104 downwards and pulls the piston 104 upwards into and out of the priming chamber 106.

Figure 2B:
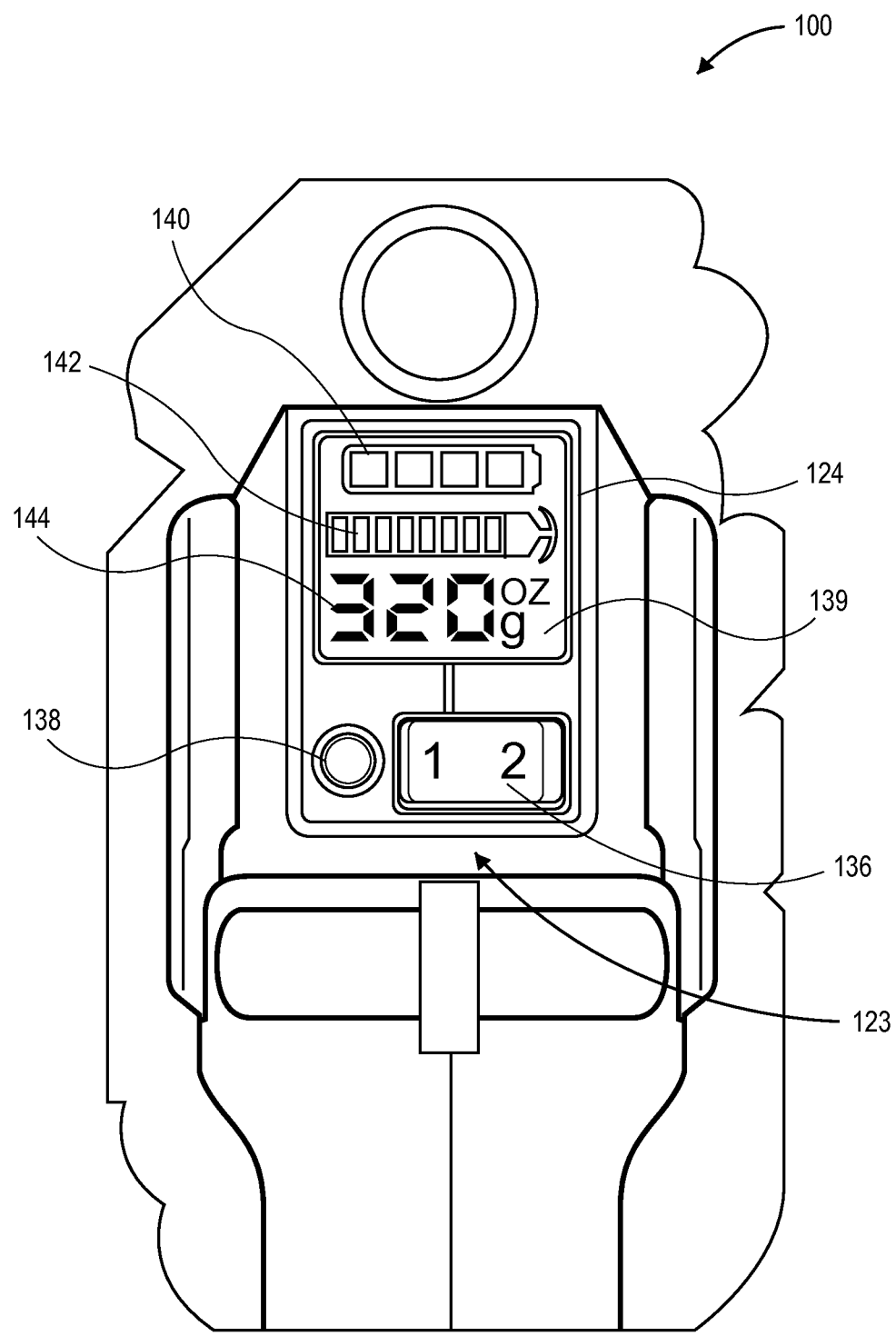
FIG. 2B illustrates a perspective view of a display and inputs of the system, according to an embodiment.

FIG. 2B illustrates a perspective view of the display 124 and the inputs 123, according to an embodiment. As shown, the inputs 123 are provided by a switch 136 and a button 138. The switch 136 may have, in one specific example, two positions, which may be labeled as shown. The switch 136 may thus indicate to the controller 122 (FIG. 1) the desired speed setpoint for the motor 102, i.e., either setpoint "1" or setpoint "2." Further, the button 138 may provide the meter reset, e.g., when a new cartridge for the reservoir 114 (FIG. 1) is inserted. In response to actuation (depressing) of the meter reset button 138, the controller 122 may reset the amount of grease used to zero, or reset the amount of grease available to the present amount, or both, reflective of a new, unused cartridge being provided. In other embodiments, either or both of the inputs 123 may be replaced by numerical inputs, such that a range of setpoints and/or a range of cartridge sizes for the meter reset may be provided.

The display 124 may include a screen 139, which may provide one or more indicators (three shown: 140, 142, 144) that may be employed to indicate one or more conditions of the system 100. For example, the indicator 140 may show a power status for the power supply 110 (FIG. 1). In embodiments in which the power supply 110 is a battery, the indicator 140 may indicate a remaining charge in the battery. Further, the indicator 142 may visually depict a fill level of the reservoir 114. For example, the indicator 142 may provide marks indicating the extent to which the reservoir 114 is filled. The marks may disappear, change color, move from filled in to empty, etc., in the indicator 142 as the grease from the reservoir 114 is removed by operation of the system 100. The indicator 144 may indicate a weight or mass for the remaining grease in the reservoir 114. Additional indicators representing other parameters of the system 100 may also be included, without limitation. Further, the screen 139 may also serve as an indicator, and may flash, change colors, etc. so as to provide an alarm, as will be described below.

Figure 3:
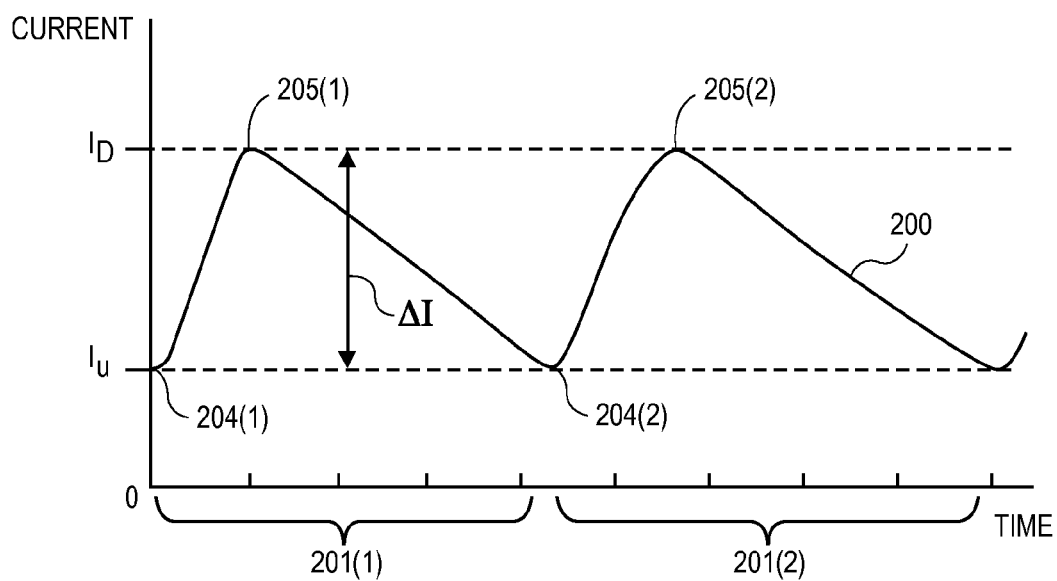
FIGS. 3-5 illustrate plots of current-to-time relationships of power supplied to the motor of the system, according to an embodiment.

With additional reference to FIG. 1, FIG. 3 illustrates a simplified current-to-time relationship 200, according to an embodiment. The current-to-time relationship may be derived from the electrical current measurements taken by the sensor 118. In some cases, the current-to-time relationship may include non-linearities, noise, time delays, etc., such that the relationship deviates from the simplified relationship shown.

The relationship 200 shown in FIG. 3 may reflect normal operation, i.e., when the reservoir 114 has grease and the fitting 116 is not blocked. The piston 104 may undergo cycles, two of which are shown: 201(1) and 201(2). During operation, the current drawn by the motor 102 may vary according to piston 104 position and direction. For example, in the first cycle 201(1), the piston 104 may be undergoing an upstroke at 204(1) and a downstroke at 205(1). Similarly, in the second cycle 201(2), the piston 104 may be undergoing an upstroke at 204(2) and a downstroke at 205(2). Since there is relatively little impeding the progress of the piston 104 during the upstrokes (e.g., including points 204(1)-(2)), the current drawn by the motor 102 may reach a minimum during the upstroke. This relatively low current associated with an upstroke is shown as $I_U$.

Further, during the upstrokes, while the system 100 is operating normally, the grease may be received into the priming chamber 106. At the end of each upstroke, the piston 104 may change directions and begin a downstroke (e.g., including points 205(1)-(2)), thereby forcing the grease through the outlet 117. During this time, the current drawn by the motor 102 may reach a maximum. The current drawn by the motor 102 during the downstrokes may be expected to be higher than the current drawn by the motor 102 during the upstrokes, since the advancement of the piston 104 on the downstroke may be resisted by the viscosity of the grease being moved through the outlet 117 at pressure. At its maximum points (i.e., at points 205(1) and 205(2)), the current during the downstroke may be as indicated at $I_D$.

Thus, during normal operation, as the piston 104 drives grease from the reservoir 114 to the fitting 116, the current applied to the motor 102 cyclically varies between $I_D$ and $I_U$, as shown. However, the specific current drawn by the motor 102 may vary from system 100 to system 100, due to differences in design, friction, operation conditions, component wear, battery conditions, etc. Accordingly, the controller 122 may monitor the change in current $\Delta I$ between the maximum current $I_D$ drawn during the downstroke and the minimum current $I_U$ drawn during the upstroke, so as to determine the efficacy of the piston 104 cycle in pumping grease.

When the controller 122 determines that the difference in current $\Delta I$ is above a predetermined threshold, for example, within a predetermined range, the controller 122 may, in response, determine that the piston 104 successfully completed the cycle 201(1)-(2), i.e., the piston 104 was effective to expel grease from the chamber 106 during the downstroke ("an effective downstroke"). The controller 122 may make these determinations each time the piston 104 transitions from the current $I_D$ drawn during the upstroke to the higher current $I_D$ drawn during the downstroke.

Further, in at least one embodiment, the controller 122 may be programmed with a predetermined value for the dose amount delivered by a successful cycle. The dose amount may be defined as, for example, the change in volume in the chamber 106 between when the piston 104 is at the end of an upstroke and when the piston 104 is at the end of a downstroke. Thus, when the controller 122 registers a successful cycle (e.g., with a downstroke that was effective in expelling grease), the controller 122 may add the dose amount of grease to a running total of grease used. In another embodiment, the controller 122 may count the downstrokes (or cycles) and keep a running total thereof. It will be appreciated that a variety of ways to track grease usage based on stroke count may be employed, consistent with the present disclosure.

Figure 4:
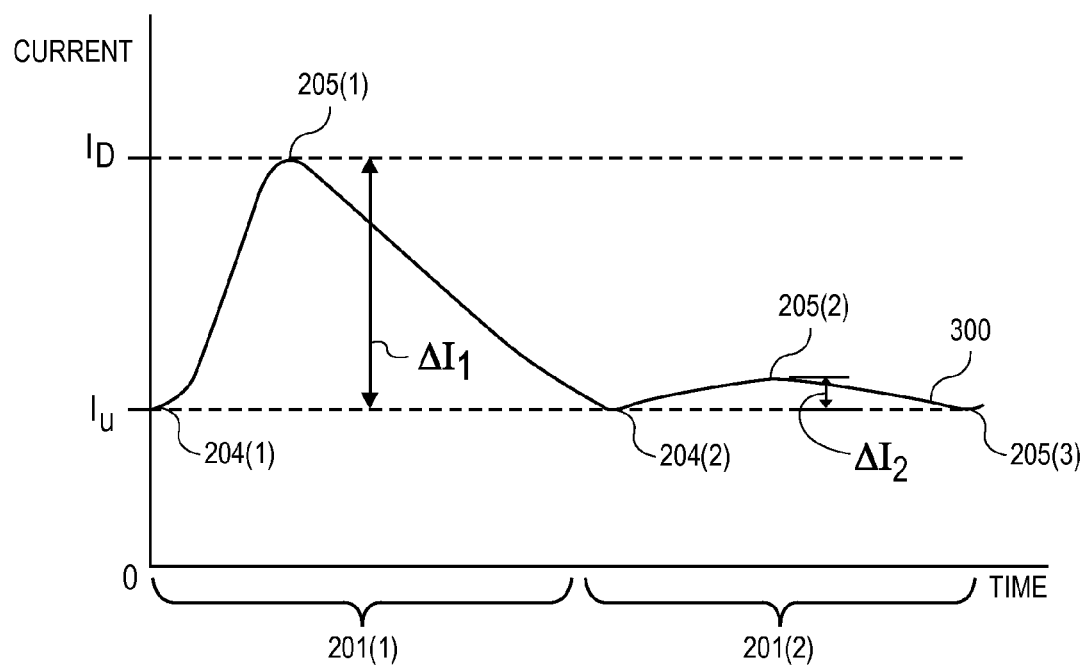

With continuing reference to FIG. 1, FIG. 4 illustrates a current-to-time relationship 300 during a loss of prime. A loss of prime may be defined as receiving air into the priming chamber 106, rather than or in addition to grease. One example of when this may occur is when an air pocket exists in the grease in the reservoir 114. Another example may be when any conduits between the reservoir 114 and the chamber 106 are at least partially empty, such as when a new grease cartridge is provided for the reservoir 114. During a loss of prime, the system 100 may draw in grease from the reservoir 114, but air may be received into the priming chamber 106. Thus, at least one, or a part of one, of the downstrokes may result in air, rather than grease, being ejected through the outlet 117. This may be considered an ineffective downstroke, which results in an unsuccessful cycle.

In the illustrated relationship 300, the second cycle 201(1) includes an ineffective downstroke, e.g., due to a loss of prime. During a loss of prime, the force required to push the piston 104 during the downstroke may be less than when the priming chamber 106 is full of grease. Accordingly, the maximum current drawn by the motor 102 during the downstroke, e.g., at point 205(2), may be less than the maximum current drawn by the motor 102 during the downstroke in the first cycle 201(1). For example, the maximum current drawn by the motor 102 during the downstroke of the second cycle 201(1), i.e., during the loss of prime, may be about the same as the current drawn by the motor 102 during the upstrokes, or may be slightly more.

As such, the current change $\Delta I_1$ between the minimum at 204(1) and maximum at 205(1) (i.e., $I_D$ and $I_U$) during the first cycle 201(1) is greater than the current change $\Delta I_2$ between the minimum at 204(2) and maximum at 205(2) during the second cycle 201(2). For example, a threshold of current change indicating a successful cycle may be below the current change $\Delta I_1$ but above the current change $\Delta I_2$. As such, the controller 122 may determine, based on the current change $\Delta I_1$ being above the threshold and the current change $\Delta I_2$ being below the threshold, that the downstroke of the first cycle 201(1) was effective to pump the grease, while the downstroke of the second cycle 201(2) was ineffective. Accordingly, the controller 122 may count the effective downstroke of the first cycle 201(1) and discount the ineffective downstroke of the second cycle 201(2) in the consideration of the total amount of grease pumped.

In some cases, the system 100 may recover from a loss of prime in subsequent cycles, for example, after an air pocket is passed. Other situations, such as when the reservoir 114 runs out of grease, the system 100 may not be able to recover without intervention (e.g., provision of a new cartridge for the reservoir 114). Such situations may lead to cavitation. In cavitation, the piston 104 may be unable to pump air or grease, and thus the piston 104 may generally operate with relatively little resistance in either the upward or downward direction, resulting in the current differential $\Delta I$ being below range or threshold. Thus, the controller 122 may determine that the system 100 is in cavitation, e.g., the reservoir 114 is empty, based on the current difference.

The controller 122 may display an indication of a loss of prime, that cavitation is occurring, and/or that the reservoir 114 is empty. The indication may include an audible alarm, visual display of an icon, color, flashing screen, etc. Further, the controller 122 may shutdown the motor 102 or take another corrective action in such instances.

Figure 5:
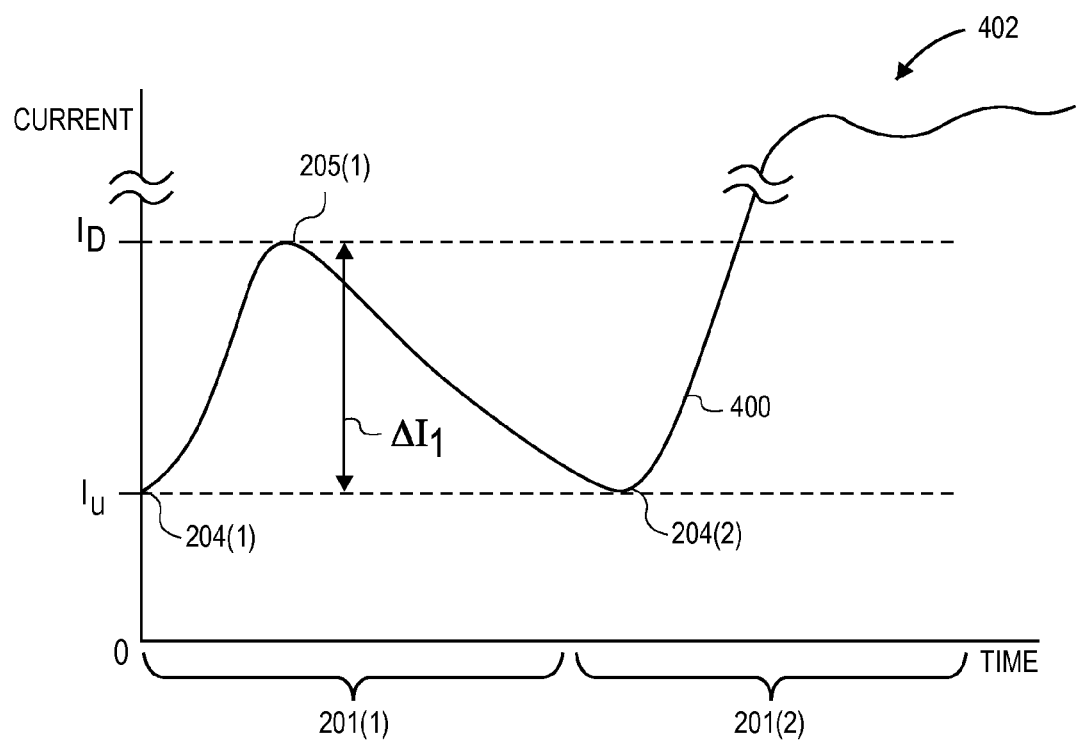

In some cases, for example, when the fitting 116 is blocked, or in other situations in which the piston 104 is prevented from advancing in the priming chamber 106, a stall may result. The controller 122 may detect a stall using the sensor 118. With continuing reference to FIG. 1, FIG. 5 illustrates a current-to-time relationship 400 for the onset of a stall 402 after the first cycle 201(1). As shown, the first cycle 201(1) may proceed as normal, with a minimum current drawn during the upstroke at 204(1) followed by a higher maximum current at 205(2) indicating an effective downstroke. For example, however, the fitting 116 may have become blocked after the downstroke of the first cycle 201(1). Thus, the piston 104 may be unable to advance into the second cycle (FIG. 3), regardless of the current supplied to the motor 102; thus, the current may spike, as shown at 402, indicating a stall.

In some cases, the stall condition may be determined by the current being drawn by the motor 102 exceeding a predetermined threshold. The predetermined threshold may be, for example, a predetermined value, a multiple of or certain amount higher than the maximum downstroke current $I_D$, etc.

When a stall is detected, the controller 122 may alert a user or otherwise take corrective action to avoid the continued stall condition. For example, the controller 122 may display a warning, e.g., a flashing color or other type of visual indicator using the display 124. The controller 122 may also sound an audible alarm. In other cases, the controller 122 may shutdown the motor 102, e.g., switch off the connection with the power supply 110.

Accordingly, it will be appreciated that the system 100, including the controller 122, may provide an accurate gauge of the amount of grease used and/or the amount of grease remaining in the reservoir 114. The controller 122 may discount or ignore unsuccessful cycles and/or ineffective downstrokes, e.g., during a loss of prime, while considering the amount of grease pumped by the successful cycles. Further, the controller 122 may alert a user and/or take other corrective action to avoid continued cavitation and/or stall.

Figure 6:
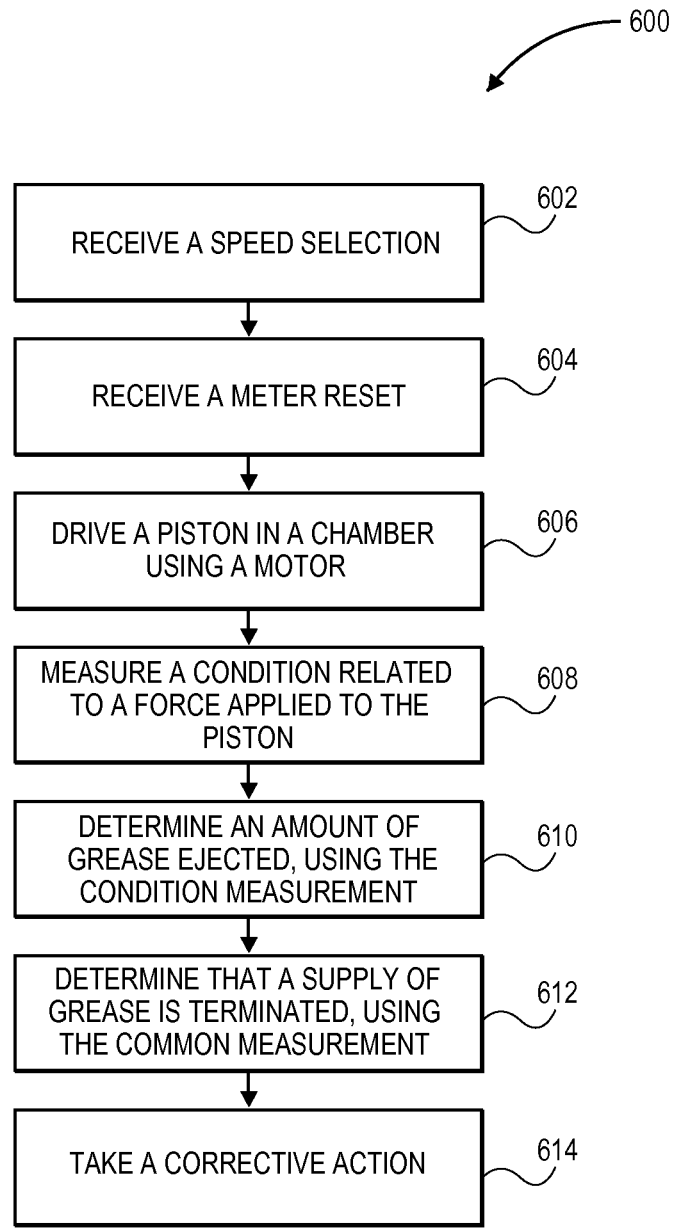
FIG. 6 illustrates a flowchart of a method for dispensing a lubricant, such as grease, according to an embodiment.

With continuing reference to FIG. 1, FIG. 6 illustrates a flowchart of a method 600 for sensing grease delivery, according to an embodiment. The method 600 may proceed by operation of an embodiment of the system 100, for example, and may thus be best understood with reference thereto. However, it will be appreciated that the method 600 is not limited to any particular structure unless otherwise stated herein.

The method 600 may begin by receiving a speed setpoint selection, e.g., via the input 123, as at 602. The controller 122 may respond by modulating the speed of the motor 102, such that the motor 102 moves the piston 104 to pump grease at the rate associated with the speed setpoint. The method 600 may also include receiving a meter reset, also, e.g., via the input 123, as at 604. The meter reset may indicate an amount of grease in the reservoir 114 available for use. Further, the method 600 may include driving the piston 104 using the motor 102, as at 606. The method 600 may also include measuring a condition related to the force applied to the piston 104, at 606. Measuring the condition may proceed by measuring a current drawn by the motor 102.

The method 600 may include determining an amount of grease pumped by the system 100 by using the condition measurement, as at 610. For example, if the current difference between the maximum current drawn during the downstroke and the minimum current drawn during the upstroke is greater than a predetermined threshold, or within a predetermined range, a dose amount of grease may be added to a running sum, or a count of the number of downstrokes or cycles incremented (and later multiplied by the dose amount, for example). On the other hand, if the current difference is below the predetermined threshold, the controller 122 may refrain from incrementing the total amount of grease used, the number of downstrokes, etc., so as to discount the ineffective downstroke, as evidenced by the low current difference. Thus, the method 600 may include accurately measuring the amount of grease ejected, neglecting ineffective downstrokes.

The method 600 may also include calculating and displaying an amount of the grease remaining in the reservoir 114, using the amount of grease available at the meter reset minus the amount ejected. For example, the controller 122 may intermittently, e.g., at time intervals, after a certain number of cycles, etc., update a visual indicator on the display 124, so as to indicate a proportion of the grease remaining in the reservoir 114, an amount (e.g., weight, mass, volume, etc.) of grease remaining in the reservoir 114, or the like.

Before, during, or after determining the amount of grease ejected at 610, the method 600 may also include determining that the supply of grease (e.g., from the reservoir 114) has terminated using the condition measurement, as at 612. The grease supply may terminate when the reservoir 114 is empty, or when the fitting 116 is blocked, or the like. Such termination of the grease supply may result in the system 100 cavitating or stalling.

When the current difference between the upstroke and the downstroke is lower than the predetermined threshold or lower than the range of current differences, the controller 122 may determine that the system 100 is experiencing a loss of prime, or even cavitating, potentially indicating that the reservoir 114 is empty. Further, if the controller 122 registers that a high current or current difference between upstroke and downstroke above a predetermined amount, is applied, the controller 122 may determine that the system 100 is or is about to begin a stall.

The method 600 may take corrective action, as at 614, in response to determining that the supply of grease is terminated or that the system 100 is in a stall, as at 612. For example, the controller 122 may display a status on the display 124, sound an alarm, and/or shut down the system 100.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An apparatus for dispensing a lubricant, comprising:
   a chamber having an inlet through which the lubricant is received and an outlet through which the lubricant is ejected;
   a piston movably positioned in the chamber to take lubricant into the chamber and eject it therefrom;
   an electric motor coupled with the piston and configured to drive the piston;
   a sensor configured to take a measurement of an electrical current drawn by the motor to move the piston in the chamber; and
   a controller coupled with the sensor so as to receive data related to the measurement from the sensor, wherein the controller is configured to determine, using the measurement, an amount of lubricant ejected by the piston, and wherein the controller is configured to distinguish between when the apparatus is experiencing a loss of prime and when the apparatus is cavitating based on the electrical current by comparing the electrical current during two or more cycles of the piston.

2. The apparatus of claim 1, wherein the lubricant comprises grease.

3. The apparatus of claim 1, wherein the controller is configured to determine whether a downstroke of the piston ejected lubricant from the chamber based on the electrical current drawn by the motor.

4. The apparatus of claim 3, wherein the controller is configured to determine that the piston ejected the lubricant during the downstroke when a difference between the electrical current drawn by the motor during an upstroke of the piston and the electrical current drawn by the motor during the downstroke is greater than or equal to a predetermined threshold.

5. The apparatus of claim 3, wherein the controller is configured to discount the downstroke when, during at least a portion of downstroke, the lubricant was not ejected from the chamber.

6. The apparatus of claim 5, wherein the controller is configured to determine that the lubricant was not ejected during at least a portion of the downstroke based on a current difference between the electrical current drawn by the motor during the downstroke and the current drawn by the motor during an upstroke being below a predetermined threshold.

7. The apparatus of claim 6, wherein the electrical current drawn by the motor during the downstroke comprises a maximum electrical current drawn by the motor during the downstroke and the electrical current drawn by the motor during the upstroke comprises a minimum electrical current drawn by the motor during the upstroke, the current difference being calculated using the maximum electrical current and the minimum electrical current.

8. The apparatus of claim 1, further comprising a reservoir coupled with the inlet of the chamber and configured to transfer lubricant thereto during an upstroke of the piston, wherein the controller is configured to determine an amount of lubricant remaining in the reservoir based at least partially on the measurement.

9. The apparatus of claim 8, further comprising:
   one or more inputs coupled with the controller, wherein at least one of the one or more inputs indicates a refill of the reservoir.

10. The apparatus of claim 9, further comprising a motor coupled with the piston, to drive the piston, and coupled with the controller, wherein at least one of the one or more inputs provides data to the controller related to a speed setpoint for the motor.

11. The apparatus of claim 10, wherein the controller is configured to vary speed of the motor based on the speed setpoint.

12. The apparatus of claim 1, wherein the apparatus is able to recover from the loss of prime without user intervention, and wherein the apparatus is not able to recover from cavitating without user intervention.

* * * * *